United States Patent [19]

Forgac

[11] 4,411,674
[45] Oct. 25, 1983

[54] CONTINUOUS CLEAN BAG FILTER APPARATUS AND METHOD

[75] Inventor: John P. Forgac, Lakewood, Ohio

[73] Assignee: Ohio Blow Pipe Co., Cleveland, Ohio

[21] Appl. No.: 269,631

[22] Filed: Jun. 2, 1981

[51] Int. Cl.³ .................. B01D 46/04; B01D 46/48; B01D 50/00

[52] U.S. Cl. .................. 55/304; 55/315; 55/338; 55/341 NT; 55/431; 55/466; 55/DIG. 32; 406/88; 406/90; 406/94; 406/172

[58] Field of Search .......... 55/315, 338, 431, 466, 55/304, 341 NT, 96–97, DIG. 32; 406/88, 90, 94, 139, 146, 171–172

[56] References Cited

U.S. PATENT DOCUMENTS

| | | | |
|---|---|---|---|
| 513,123 | 1/1894 | Marmon | 55/315 X |
| 1,844,635 | 2/1932 | Caller | 406/88 |
| 2,771,158 | 11/1956 | Bray et al. | 55/315 X |
| 2,868,590 | 1/1959 | Allen et al. | 406/90 |
| 2,966,232 | 12/1960 | Austin | 55/315 X |
| 3,069,205 | 12/1962 | McIver et al. | 406/172 X |
| 3,146,080 | 8/1964 | Ruble et al. | 55/315 X |
| 3,273,317 | 9/1966 | Vicard | 55/338 X |
| 3,473,300 | 10/1969 | Wilm et al. | 55/315 X |
| 3,491,518 | 1/1970 | Williams | 55/315 X |
| 3,887,343 | 6/1975 | Margraf | 55/466 X |

FOREIGN PATENT DOCUMENTS

| | | | |
|---|---|---|---|
| 661670 | 3/1964 | Italy | 406/90 |
| 824749 | 12/1959 | United Kingdom | 55/315 |
| 1145432 | 3/1969 | United Kingdom | 406/171 |

*Primary Examiner*—Kathleen J. Prunner
*Attorney, Agent, or Firm*—Maky, Renner, Otto & Boisselle

[57] ABSTRACT

A continuously cleaned bag filter provides a second filter stage for removing dust from air discharged from a cyclone or other primary separator. The primary separator removes the majority of particulate matter from air delivered thereto. In the bag filter dust is filtered from the air, which is discharged through the filter walls. The filtered dust is conveyed along the bottom of the bag filter by an air conveyor and is recirculated back to the primary separator for removal thereat. The air conveyor and a recirculating air blower, the latter providing impetus to carry dust back to the primary separator, are balanced relative to the inflowing air to the bag filter from the primary separator; such balance prevents excessive back-pressure or negative pressure in the filter bags that would otherwise interfere with ordinary air discharge therefrom.

15 Claims, 3 Drawing Figures

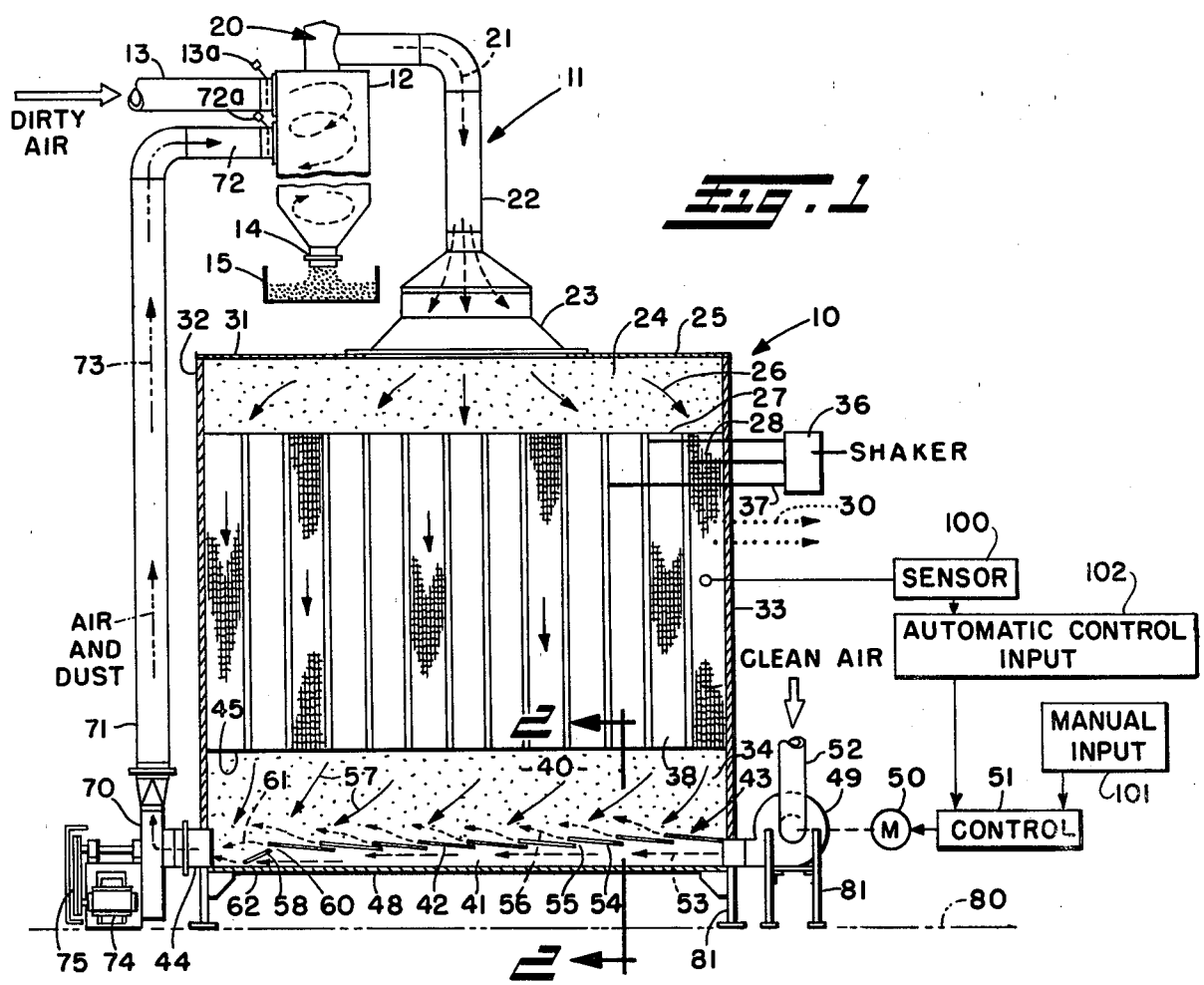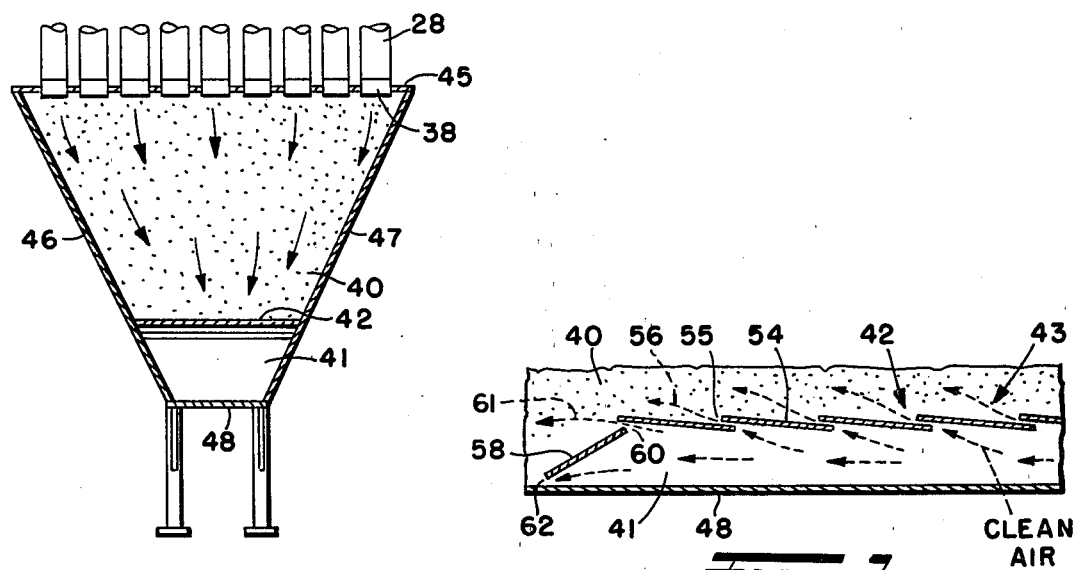

CONTINUOUS CLEAN BAG FILTER APPARATUS AND METHOD

BACKGROUND

The present invention relates generally, as indicated, to pollution control, namely filtering of particulate matter and more specifically to apparatus and method for filtering dust or other particulates from a carrier medium, such as air.

Pollution control equipment often is used in various environments, such as in an industrial plant, to remove dust or other particulate matter. As used herein dust means lightweight or heavy particulate matter; examples may be lightweight dust ordinarily carried by natural air currents, sawdust, metal chips, ceramic dust, coal dust, rock dust, and other heavier particulate matter that may be drawn and carried by a carrier fluid, such as an air stream provided by a suction device. Air is described herein as the preferred carrier fluid, but it will be appreciated that the principles of the invention may be employed using other carrier fluids.

Typically dust laden air, sawdust, etc. are drawn from a production environment, for example, via a pneumatic suction apparatus. The output from such suction apparatus is a flowing stream of dirty (dust laden) air. To separate the dust from such dirty air a filtering or separation process is required. For example, the dirty air may be fed to a cyclone separator of conventional design in which the particulate matter is removed from the air and is collected for disposal. The clean air leaving the cyclone separator may be discharged into the surrounding environment or may be filtered by a secondary filter, such as a conventional bag filter.

Air entering such a conventional bag filter is filtered by filter bags therein and is discharged through the walls of the filter bags. The dust, on the other hand, remains in the filter bags. Relatively frequent cleaning of the filter bags is required. Such cleaning usually entails cleaning of the individual filter bags or replacement thereof. Moreover, such cleaning maintenance may require shut-down of the main pollution control equipment, which is undesirable during operational production hours in a plant, possibly causing a temporary plant shut-down during such maintenance, and would be expensive because of overtime labor if the maintenance is performed after ordinary working hours.

SUMMARY OF THE INVENTION

In accordance with the present invention an apparatus and method provide for continuous cleaning of a bag filter apparatus. Such bag filter may be a secondary filtering station downstream of a primary separator or filter, such as a cyclone separator and, therefore, be part of an integral separating/filtering system. Such system, then, may be part of pneumatic pollution control equipment or the like.

According to the invention, a continuous cleaning bag filter for use with a primary separator includes a filter for filtering particulate matter from a fluid carrier, an inlet for receiving the fluid carrier with particulate matter carried thereby, and a fluid conveyor for discharging particulate matter filtered from the fluid carrier.

According to another aspect of the invention, a filtering system includes a primary separator for filtering particulate matter from a fluid carrier, a filter for filtering particulate matter from the fluid carrier discharged from the primary separator, and a recirculator for recirculating back to the primary separator particulate matter filtered out in the filter.

According to an additional aspect, a fluid conveyor for removing particulate matter from a particulate matter collection zone of a pressurized bag filter or the like, includes a fluid plenum for receiving an inlet flow of fluid, a wall for separating the plenum from the area of pressurization of the bag filter, openings in the wall for directing a flow of such fluid from the plenum into such pressurized area and in a direction substantially parallel to the wall while carrying particulate matter substantially parallel to the wall, and an outlet for conducting the fluid and particulate matter carried thereby out from the collection zone.

According to a further aspect, a method of filtering particulate matter from a fluid carrier includes delivering the fluid carrier and particulate matter carrier thereby into a bag filter, permitting at least some of the fluid carrier to exit the bag filter while the particulate matter remains in the bag filter, and using a further fluid carrier substantially controllably conducting particulate matter from such bag filter.

With the foregoing in mind, a primary object of the present invention is to minimize particulate pollution, and especially dust, from a particular environment, especially an industrial environment.

Another object is to minimize cost of pollution control equipment, especially in an industrial environment.

An additional object is to improve effectiveness of pollution control equipment, especially for removing dust and/or other particulates from an environment.

A further object is to reduce servicing, cleaning, and/or replacing of filter bags in a bag filter apparatus while preferably extending the useful life thereof.

Still another object is to reduce labor required to service bag filter equipment.

Still an additional object is to clean continuously a bag filter apparatus.

Still a further object is to recirculate particulates through pollution control equipment to improve effectiveness of particulate removal from a carrying medium.

Even another object is to provide a balanced air conveying system.

Even an additional object is to provide recirculation of dust or other particulates from a bag filter apparatus or the like at the output of a primary separator, such as a cyclone separator, back to the primary separator.

Even a further object is to provide improved pollution and environmental control methods and apparatus in accordance with the foregoing objects.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side elevation view, partly in schematic form, of a continuous clean bag filter apparatus in accordance with the present invention used in conjunction with pollution control equipment employing a primary cyclone separator;

FIG. 2 is a fragmentary section view of the bag filter apparatus looking generally in the direction of the arrows 2—2 of FIG. 1; and FIG. 3 is an enlarged fragmentary side elevation view of the air conveyor of the bag filter apparatus of FIG. 1.

DESCRIPTION OF THE PREFERRED EMBODIMENT

Referring now in detail to the drawing, wherein like reference numerals designate like parts in the several figures, and initially to FIG. 1, a continuous clean bag filter apparatus is generally indicated at 10. The apparatus 10 is part of a separator/filter system 11, which also includes a primary separator 12, preferably a conventional cyclone separator. The system 11 in turn may be part of the pneumatic pollution control system in which, for example, a vacuum is created to draw in air and particulate matter (together forming so-called dirty air) from a production environment. The particulate matter may be dust, sawdust, metal dust, metal fillings, ceramic dust, larger particulates, and so on, (as used herein dust, particulates, particulate matter or material, etc. are used interchangeably) depending on the capacity of the pneumatic system. The dirty air is directed via a dirty air inlet duct 13 to the cyclone separator 12.

In the cyclone separator 12 a majority of the dust is removed from the air in conventional fashion. Accordingly, the cyclone separator 12 has a particulates outlet 14 through which particulate material is discharged from the cyclone separator and that particulate material is delivered into a particulates collection receptacle 15 for subsequent solid waste disposal, recycling, or the like.

The cyclone separator 12 also has its own air outlet 20 through which substantially clean air is discharged. Such substantially clean air, however, still contains some quantity of dust, which had not been separated out in the cyclone separator 12. The flow of such substantially clean air with some dust content is depicted by the dashed arrows 21.

A connection duct 22 couples the substantially clean air with dust to the inlet 23 of the bag filter 10, and that inlet is coupled to a large bag filter inlet chamber 24 at the top of the bag filter housing 25. The chamber 24 serves to distribute the flowing air, as is shown by the arrows 26, approximately evenly to the filter bag inlets 27 of the several filter bags 28. The filter bags 28 themselves may be cloth fabric, paper, or other material that contains particulates within the filter bag while permitting the flowing air, which carries the particulates, to be discharged through the side walls of the filter bags. The clean air discharged to the atmosphere from the filter bags is indicated by the dotted flow arrows 30. Positive pressure is needed in the bags 28 relative to atmospheric pressure to assure the output flow 30.

As is seen in FIGS. 1 and 2 the bag filter housing 25 includes a top wall 31 to which the bag filter inlet 23 is connected, end wall supports 32, 33, and bottom chamber 34. The various portions 31–34 of the bag filter housing 25 are assembled in substantially conventional manner to provide the desired support for the individual filter bags 28. Moreover, a shaker apparatus represented at 36 is mechanically connected by conventional means 37 to one or more portions of the bag filter housing 25 or to the filter bags themselves. Upon energization, the shaker 36 shakes the filter bags, usually by a slight horizontal vibration-type movement, to cause that dust collected in the bags to drop down through respective filter bag outlets 38 into the bottom chamber 34.

In the past conventional filter bags usually have had solid bottoms without any outlets 38. Those prior filter would collect dust and subsequently would have to be removed for cleaning or for disposal. On the other hand, in accordance with the present invention, the bottoms of the filter bags 28 have open outlets 38 for delivering dust down into the bottom chamber 34. The filter bags 28 are otherwise like conventional filter bags, and they are mounted in housing 25 by conventional means.

Although in conventional bag filters the filter bags may be shaken to cause particulates to drop down to the bottom of respective filter bags, in the present invention, the shaking of the filter bags, the momentum of the individual particulates, and the open filter bag outlets 38 permit the particulates continuously to be removed automatically from the filter bags. Moreover, in the bottom chamber 34 the particulates continuously are conducted out of the bag filter apparatus 10 for recirculation back to the cyclone separator 12, as will become more apparent from the following description.

The bottom chamber 34 is a substantially closed chamber having two discrete portions, namely a collection zone 40 in which particulates dropping out of the filter bag outlets 38 are collected and conducted out of the bottom chamber and a plenum 41. A slatted wall 42 separates the collection zone or trough 40 from the plenum 41, and the wall 42 cooperates with the plenum 41 to direct a flow of air in the zone 40 to provide an air conveyor 43 for conducting particulates out of the zone 40 through a bag filter dust outlet 44 in the bag filter side wall 32. The bottom chamber 34 is confined by a top wall 45, through which the filter bag outlets 38 communicate with the collection zone 40, sloped sidewalls 46, 47 (which form a trough-like collector), horizontal flat bottom wall 48, and portions of the bag filter housing end walls 32, 33. The trough-like shape of the chamber 34, and particularly of the collection zone 40 helps optimize particle concentration and flow control and efficiency vis-a-vis the dust dropping out of the filter bag outlets 38 and carried along to the dust outlet 44.

Supplying the air flow for the air conveyor 43 is an air conveyor blower 49 (FIG. 1) driven by a motor 50 at a speed controlled by a conventional motor control 51. The blower 49 may be a conventional squirrel cage blower, for example, that draws in clean air from inlet 52 and blows the clean air along the path of the dashed arrows 53 in the plenum 41.

The slatted wall 42 seen in FIGS. 1-3 is comprised of a plurality of slats 54 (supported by means, not shown, on the side walls 46, 47) which are slightly sloped relative to horizontal in a manner illustrated, for example, in the drawing, with openings 55 between respective adjacent pairs of slats. The sloping slats and their openings are so arranged to direct some of the flowing air from the plenum 41 into the collection zone 40 in a direction that is substantially parallel to the wall 42, as is shown generally by the dashed flow arrows 56 in the zone 40.

Such air flow 56 along the wall 42 conveys particulates that have dropped into the zone 40 from the filter bag outlets 38 along the wall 42 in a direction toward the bag filter dust outlet 44, as is shown generally by the dust flow direction arrows 57 in the collection zone 40. In the preferred embodiment, the slats 54 have, for example, a 9-inch length dimension, i.e. the dimension substantially parallel to the plenum air flow arrows 53; the adjacent respective slats may overlap with each other approximately one inch, and the height of respective slots or openings 55 may be approximately 3/16-inch.

One or more direction control slats 58 is provided at the end of the plenum 41 remote from the blower 49 and proximate the bag filter dust outlet 44. The direction control slat 58 is oriented in a reverse angular direction, as is compared to a horizontal plane, relative to the angular orientation to horizontal of the slats 54. It is the purpose of the direction control slat 58 to direct air flow out of the plenum 41 substantially directly into the bag filter dust outlet 44. Due to the reverse angular orientation, air exiting the plenum at the slot or opening 60 between the direction control slat 58 and the immediately adjacent slat 54 air will be directed closer to horizontal or even in a slightly downward direction, as is represented by the arrow 61, relative to the direction of the flow arrows 56. The air stream or flow represented by arrow 61 thus helps to improve efficiency of conducting particulates carried by the air conveyor directly into the bag filter dust outlet 44. Additionally, the slotted opening 62 between the bottom of the direction control slat 58 and the bottom wall 48 of the bottom chamber 34, provides a further air stream oriented directly into the bag filter dust outlet 44 further to facilitate conduction of particulates into the outlet and to avoid any dead air space at the bottom wall 48 adjacent the outlet 44 at which particulates might otherwise collect.

The air flow and particulates entering the bag filter dust outlet 44 is conveyed by a recirculation blower 70 via a recirculation duct 71 to the recirculation air inlet 72 of the cyclone separator 12. The inlet 72 is connected directly to the cyclone separator 12 so that any particulates carried in the air stream shown by the phantom lines 73 have a further chance to be separated out in the cyclone separator for delivery into the particulates collection receptacle 15. The recirculation blower 70 is adjustably belt driven by an electric motor 74, i.e. the blower speed may be adjusted by adjusting the belts 75, the pulley(s) mounting the belts, the motor 74, etc. Back pressure dampers 13a, 72a in inlet ducts 13, 72 may be adjusted to prevent blow back from the cyclone separator 12 into an idle pipe system.

The flow rates and air pressures occurring in the recirculation duct 71, in the plenum 41, and in the collection zone 40 are related to each other and to the air pressure and flow rate of the air in the filter bags 28 received via the bag filter inlet 23 from the cyclone separator 12. More specifically, the air flow, which forms the air cushion or air conveyor 43, is balanced with respect to the flow of air emerging from the filter bag outlets 38 to prevent excessive back pressure building up in the filter bags 28. Such excessive back pressure could interfere with the filtering efficiency of the filter bags or could damage them, and could interfere with the efficient operation of the cyclone separator 12 by causing a further impedance to flow of the substantially clean air 21 through the connecting duct 22. Moreover, the recirculation blower 70 is balanced with the total flow of air entering the collection zone 40 both from the filter bag outlets 38 and from the plenum 41 to prevent a negative or reduced pressure in the collection zone 40 that would interfere with maximum outflow of clean air 30 from the filter bags 28. Such balancing may be effected manually when the apparatus 10 is installed and set up for operation by pragmatic analysis. Alternatively, pressure and/or flow sensors, such as that shown at 100, may be used to monitor pressure and/or flow in selected areas of the apparatus 10, such as, for example, in the connection duct 22, inlet chamber 24, filter bags 28, collection zone 40, plenum 41, recirculation duct 71, and even the cyclone separator 12; and one or more of the monitored parameters may be used to provide input data for manual, such as at 101, or automatic, such as at 102, control of, for example, the blowers 49, 70 e.g. via the control 51, belt 75 and/or motor 74, to achieve an optimum balance for efficient operation of the continuous clean bag filter apparatus 10 and/or the overall separator/filter system 11.

The bag filter apparatus 10 may be installed on a floor 80 inside or outside a production environment, as may be desired. Legs 81 support the apparatus 10 above the floor for usual reasons.

Briefly, the method of the invention for filtering particulate matter, such as dust, from a fluid carrier, such as air, includes delivering the fluid carrier and particulate matter (arrows 21) to the bag filter 10 via the inlet 23. The fluid carrier and particulate matter is distributed via the chamber 24 to the inlets 127 of respective filter bags 28 where the fluid carrier 30 is permitted to exit the filter bags while particulates remain therein and drop down to the bottom chamber 34. A further fluid carrier in the form of the air cushion or air conveyor 43 formed in the collection zone 40 substantially controllably, i.e. to maintain the desired balance described above, conducts the particulate matter out of the collection zone 40 of the bag filter apparatus 10. Further, such particulate matter is recirculated by the blower 70 and duct 71 back into a primary separator, such as the cyclone separator 12, where further primary separation occurs and some substantially clean air with some particulates still continues to exit via the outlet 20 for delivery (arrows 21) back to the bag filter apparatus 10. To facilitate the continuous cleaning of the filter bags 28, they may be shaken by the shaker 36 to shake down the particulate matter into the collection zone 40.

STATEMENT OF INDUSTRIAL APPLICATION

With the foregoing in mind, it will be appreciated that the present invention provides substantially a maximum air filtering capability with facility of operation and minimum of servicing.

I claim:

1. Continuous clean bag filter apparatus for use with a primary separator disposed relatively upstream thereof, comprising inlet means for receiving a fluid carrier and particulate matter carried thereby vertically disposed bag filter means open at opposite ends pressurized by such fluid carrier for filtering particulate matter from such fluid carrier while at least a substantial quantity of such fluid carrier discharges through a wall portion of said bag filter means, fluid conveyor means for continuously conveying from said bag filtemeans that particulate matter filtered from such fluid carrier, and outlet means for discharging particulate matter from said fluid conveyor means, said fluid conveyor means comprising a controlled fluid flow means for delivering a controlled fluid flow to convey to said outlet mean that particulate matter filtered from such fluid carrier by said bag filter means without interfering with and substantially independently of the passage of such fluid carrier through said wall portion of said bag filter means, and said outlet means comprising further controlled fluid flow means for producing a further controlled fluid flow to convey that particulate matter received from said fluid conveyor means downstream thereof, and balancing means for balancing said further controlled fluid flow means with respect to the fluid pressure in said bag filter means and the fluid pressure of said fluid conveyor means to provide such further controlled fluid flow that does not interfere substantially with operation of said bag filter means and further comprising collecting means for collecting particulate matter from said bag filter means, and wherein said controlled fluid flow means of said fluid conveyor means comprises blower means for establishing an air flow, plenum means for conducting such air flow proximate said collecting means, and flow directing means for directing at least some of such air flow in said collecting means.

2. The apparatus of claim 1, said bag filter means comprising filter bags.

3. The apparatus of claim 2, said bag filter means further comprising housing means for supporting said filter bags.

4. The apparatus of claim 2, said inlet means comprising a distribution chamber for substantially evenly distributing such fluid carrier and particulate matter to respective filter bags.

5. The apparatus of claim 4, each of said filter bags being open at the top and at the bottom thereof, and wherein such fluid carrier comprises air and each of said filter bags has porous side walls to permit air flow therethrough while retaining particulate matter within the interior thereof.

6. The apparatus of claim 1, said inlet means comprising duct means for conveying such fluid carrier and particulate matter to said bag filter means.

7. The apparatus of claim 1, said collecting means being located beneath said bag filter means, being elongated, and being substantially tapered from a relatively wide upper portion to a relatively narrower lower portion, said plenum means being positioned below said collecting means, and said flow directing means comprising a slatted wall between said collecting means and said plenum means.

8. The apparatus of claim 7, wherein said blower means is positioned at one end of said plenum means for blowing air toward the other end of said plenum means to provide such air flow, said slatted wall comprising plural overlapping wall slats, respective pairs of adjacent overlapping wall slats having respective flow openings therebetween, and a direction control slat proximate the end of said plenum means remote from said blower means.

9. The apparatus of claim 1, further comprising shaking means for shaking said bag filter means to cause particulate matter therein to drop toward a bottom portion thereof.

10. Continuous clean bag filter apparatus for use with a primary separator disposed relatively upstream thereof, comprising inlet means for receiving a fluid carrier and particulate matter carried thereby, vertically disposed bag filter means open at both ends for filtering particulate matter from such fluid carrier, said bag filter means including a wall means permeable to such fluid carrier for passing at least some of such fluid carrier therethrough while not passing such particulmatter therethrough, and fluid conveyor means for continuously conveying particlate matter filtered from such fluid carrier from said bag filter means, further comprising collecting means for collecting particulate matter from said bag filter means, and wherein said fluid conveyor means comprises blower means for establishing an air flow, plenum means for conducting such air flow proximate said collecting means, and flow directing means for directing at least some of such air flow in said collecting means, said collecting means being located beneath said bag filter means, being elongated, and being substantially tapered from a relatively wide upper portion to a relatively narrower lower portion, said plenum means being positioned below said collecting means, and said flow directing means comprising a slatted wall between said collecting means and said plenum means, wherein said blower means is positioned at one end of said plenum means for blowing air toward the other end of said plenum means to provide such air flow, said slatted wall comprising plural overlapping wall slats, respective pairs of adjacent overlapping wall slats having respective flow openings therebetween, and a direction control slat proximate the end of said plenum means remote from said blower means, said filter means comprising a housing, said fluid conveyor means being positioned proximate the bottom of said housing, outlet means for conducting particulate matter from said collecting means and conveyor means, and said direcion control slat comprising slat means positioned to direct air directly from said plenum means into said outlet means.

11. The apparatus of claim 10, further comprising recirculating means for recirculating particulate matter from said outlet means to such primary separator.

12. The apparatus of claim 11, wherein said fluid carrier comprises air, and wherein said blower means and recirculating means are balanced with respect to each other and with respect to such fluid carrier in said bag filter means to provide air flow that does not interfere substantially with operation of said bag filter means releasing air through side walls thereof.

13. A filter system, comprising a primary separator means for filtering particulate matter from a fluid carrier, filter means for filtering particulate matter from such fluid carrier discharged from said primary separator means, and recirculating means for recirculating back to said primary separator means particulate matter filtered from such fluid carrier by said filter means, said filter means comprising a vertically disposed bag filter, said recirculating means comprising a recirculating blower and a recirculating duct means for connecting said recirculating blower with said primary separator means, such fluid carrier comprising air, said filter means havng a top, sides and a bottom and comprising porous filter means for emitting air at the sides thereof, inlet means for inletting the air carrying particulate matter from said primary separator means to the top of said filter means, said bottom of said filter means being open, and further comprising conveyor means for conveying particulate matter from beneath said filter means to said recirculating means, said recirculating means being balanced with respect to at least air pressure and flow in said filter means so as not substantially to interfere with operation of said filter means releasing air through the porous sides thereof, said conveyor means comprising an air conveyor, further comprising collecting means for collecting particulate matter from said filter means, said air conveyor comprising blower means for establishing an air flow, plenum means for conducting such air flow proximate said collecting means, and flow directing means for directing at least some of such air flow in said collecting means, said collecting means being located beneath said filter means, being elongated, and being substantially tapered from a relatively wide upper portion to a relatively narrower lower portion, said plenum means being positioned below said collecting means, and said flow directing means comprising a slatted wall between said collecting means and said plenum means.

14. The system of claim 13, said primary separator means comprising a cyclone separator.

15. A vertically disposed bag filter open at opposite ends and fluid conveyor for removing particulate matter from a pressurized collection zonthe bag filter, said fluid conveyor comprising a fluid plenum means for receivng an inlet flow of fluid, wall means for separating said plenum means from such bag filter, plural opening means in said wall means for directing a flow of such fluid from said plenum means into such pressurized collection zone in a direction substantially parallel to said wall means to carry particulate matter along substantially parallel to said wall means, and outlet means for discharging such fluid and particulate matter carried thereby out from such collection zone, wherein said collection zone is located at the bottom of such bag filter further comprising blower means for establishing such fluid flow, means for connecting said blower means to said fluid plenum means, and said wall means being positioned to separate said plenum means from such collection zone, said wall means comprising a plurality of overlapping slats having respctive ones of said plural opening means therebetween for directing such fluid in a prescribed direction, said blower means being positioned at one end of said fluid plenum means for blowing such fluid toward the other end of said plenum means, and said walls means further comprising a direction control slat at the opposite end of said fluid plenum means from said blower means positioned to direct such fluid directly from said fluid plenum means into said outlet means.

* * * * *